(12) United States Patent
Walden et al.

(10) Patent No.: US 7,493,105 B2
(45) Date of Patent: Feb. 17, 2009

(54) CERTIFICATION AND ACTIVATION OF USED PHONES ON A WIRELESS CARRIER NETWORK

(75) Inventors: Michael Walden, Annapolis, MD (US); David A. Steinberg, Washington, DC (US)

(73) Assignee: Simplexity, LLC, Philadelphia, PA (US)

( * ) Notice: Subject to any disclaimer, the term of this patent is extended or adjusted under 35 U.S.C. 154(b) by 274 days.

(21) Appl. No.: 10/389,899

(22) Filed: Mar. 18, 2003

(65) Prior Publication Data

US 2004/0185833 A1 Sep. 23, 2004

(51) Int. Cl.
*H04M 3/00* (2006.01)
(52) U.S. Cl. .................... 455/414.1; 455/419
(58) Field of Classification Search ............ 455/414.1, 455/419, 414.2, 414.3, 410, 411, 418
See application file for complete search history.

(56) References Cited

U.S. PATENT DOCUMENTS

| | | | |
|---|---|---|---|
| 4,629,836 A | 12/1986 | Walsworth | |
| 4,799,156 A | 1/1989 | Shavit et al. | |
| 4,903,201 A | 2/1990 | Wagner | |
| 5,272,747 A | 12/1993 | Meads | |
| 5,289,526 A | 2/1994 | Chymyck et al. | |
| 5,335,278 A * | 8/1994 | Matchett et al. | 380/248 |
| 5,471,526 A | 11/1995 | Linnermark et al. | |
| 5,572,571 A | 11/1996 | Shirai | |
| 5,682,525 A | 10/1997 | Bouve et al. | |
| 5,710,887 A | 1/1998 | Chelliah et al. | |
| 5,754,953 A * | 5/1998 | Briancon et al. | 455/418 |
| 5,758,328 A | 5/1998 | Giovannoli | |
| 5,794,207 A | 8/1998 | Walker et al. | |
| 5,794,219 A | 8/1998 | Brown | |
| 5,809,413 A * | 9/1998 | Meche et al. | 455/411 |
| 5,815,665 A | 9/1998 | Teper et al. | |
| 5,828,956 A | 10/1998 | Shirai | |
| 5,835,896 A | 11/1998 | Fisher et al. | |
| 5,845,265 A | 12/1998 | Woolston | |
| 5,862,223 A | 1/1999 | Walker et al. | |
| 5,862,472 A * | 1/1999 | Park | 455/411 |
| 5,864,604 A | 1/1999 | Moen et al. | |
| 5,881,131 A | 3/1999 | Farris et al. | |
| 5,887,253 A * | 3/1999 | O'Neil et al. | 455/418 |
| 5,897,620 A | 4/1999 | Walker et al. | |
| 5,905,975 A | 5/1999 | Ausubel | |

(Continued)

FOREIGN PATENT DOCUMENTS

WO    WO 01/84840 A1    11/2001

(Continued)

OTHER PUBLICATIONS

Accompany—Internet Purchasing through agregation, access & advocacy, http://www.accompany.com; 3 pages.

(Continued)

*Primary Examiner*—William J Deane
(74) *Attorney, Agent, or Firm*—Patton Boggs, LLP

(57) ABSTRACT

Telecommunication services systems and methods are disclosed. The telecommunication services systems and methods preferably enable a buyer to certify and activate a used wireless telecommunications device. The systems and methods may also be employed to provide the buyer with specialized pricing options and other customized services.

24 Claims, 4 Drawing Sheets

U.S. PATENT DOCUMENTS

| | | | |
|---|---|---|---|
| 5,915,214 A * | 6/1999 | Reece et al. | 455/406 |
| 5,917,897 A | 6/1999 | Johnson et al. | |
| 5,949,875 A | 9/1999 | Walker et al. | |
| 5,966,654 A * | 10/1999 | Croughwell et al. | 455/414 |
| 6,006,251 A | 12/1999 | Toyouchi et al. | |
| 6,018,656 A | 1/2000 | Shirai | |
| 6,023,685 A | 2/2000 | Brett et al. | |
| 6,023,686 A | 2/2000 | Brown | |
| 6,055,504 A | 4/2000 | Chou et al. | |
| 6,085,171 A | 7/2000 | Leonard | |
| 6,104,798 A | 8/2000 | Lickiss et al. | |
| 6,128,742 A | 10/2000 | Felt | |
| 6,131,087 A | 10/2000 | Luke et al. | |
| 6,144,727 A | 11/2000 | Machinsky | |
| 6,195,547 B1 * | 2/2001 | Corriveau et al. | 455/419 |
| 6,205,211 B1 | 3/2001 | Thomas et al. | |
| 6,222,536 B1 | 4/2001 | Kihl et al. | |
| 6,223,290 B1 | 4/2001 | Larsen et al. | |
| 6,226,365 B1 | 5/2001 | Machinsky | |
| 6,233,566 B1 | 5/2001 | Levine et al. | |
| 6,260,024 B1 | 7/2001 | Shkedy | |
| 6,269,157 B1 | 7/2001 | Coyle | |
| 6,269,343 B1 | 7/2001 | Pallakoff | |
| 6,301,574 B1 | 10/2001 | Thomas et al. | |
| 6,308,053 B1 * | 10/2001 | Nilsson | 455/90 |
| 6,385,594 B1 | 5/2002 | Lebda et al. | |
| 6,418,415 B1 | 7/2002 | Walker et al. | |
| 6,556,820 B1 * | 4/2003 | Le et al. | 455/411 |
| 6,598,026 B1 | 7/2003 | Ojha et al. | |
| 6,628,934 B2 * | 9/2003 | Rosenberg et al. | 455/411 |
| 6,662,023 B1 * | 12/2003 | Helle | 455/558 |
| 6,665,529 B1 * | 12/2003 | Mills, Jr. | 455/411 |
| 6,771,954 B1 * | 8/2004 | Yoneyama et al. | 455/420 |
| 6,782,251 B2 * | 8/2004 | Kagay, Jr. | 455/410 |
| 2002/0001372 A1 | 1/2002 | Katz | |
| 2002/0186845 A1 | 12/2002 | Dutta et al. | |
| 2003/0092435 A1 * | 5/2003 | Boivin | |
| 2003/0224823 A1 * | 12/2003 | Hurst et al. | |
| 2004/0082319 A1 * | 4/2004 | Shaw et al. | |
| 2004/0082323 A1 * | 4/2004 | Smith | |
| 2004/0199412 A1 * | 10/2004 | McCauley | |

FOREIGN PATENT DOCUMENTS

| | | | |
|---|---|---|---|
| WO | WO 02/01891 A2 | 1/2002 | |

OTHER PUBLICATIONS

Telezoo.com: telecommunications Mar . . . Products and Connectivity Services, http://www.telezoo.com; 5 pages.

Demandline.com: How Demandline.com Works, http://www.demandline.com; 6 pages.

Anon., "Industry.Net Teams With PNC Bank on Web Commerce," Newsbytes News Network, Sep. 26, 1996.

* cited by examiner

CERTIFICATION AND ACTIVATION OF USED PHONES ON A WIRELESS CARRIER NETWORK

BACKGROUND OF THE INVENTION

1. Field of the Invention

The present invention relates to telecommunication services systems and methods, and in particular, to telecommunication services systems and methods that enable a buyer to certify and activate a used wireless telecommunications device. The systems and methods may also be employed to provide the buyer of a used wireless telecommunications device with specialized pricing options and other customized services.

2. Description of the Prior Art

Security elements, which are becoming an essential component of telecommunication services, are used to authenticate the buyer of a wireless telecommunications device. Based on current technology, security elements may take many forms, including removable and non-removable types, relative to the telecommunications device. A well-known removable type of security element is a subscriber identity module (SIM), currently used in telecommunications devices that operate according to the Global System for Mobile (GSM) standard.

A service certificate is an electronic document signed by a trusted third party, i.e., a certification agency (CA)—which states that a named entity is a certified buyer of the public key contained in the certificate for the service identified by the certificate number. Service certificates may be used as electronic credit cards in mobile e-commerce. However, since many "credit cards" can be assigned to a small number of key pairs, the issuer of the security may not be the issuer of the service certificate, so that the issuer of the security element does not control all uses of the security element.

Currently, if a SIM-enabled wireless telecommunications device is lost or stolen, a buyer can notify his or her wireless service provider, who can block access to the network at the wireless infrastructure. FIG. 1 illustrates this scenario. Wireless phone 101 using SIM card 102 normally accesses the wireless operator's infrastructure 103 through public land mobile network (PLMN) 104. In turn, the public switched telephone network (PSTN), 105, and the Internet, 106 can be accessed. When access to the network is denied at infrastructure 103, as indicated by the cross in the box depicting 103, the denial of service is based on the phone number of the lost phone recorded in the phone's SIM card.

A legitimate buyer of the wireless telecommunications device notifies the certificate issuer of the loss. The issuer then adds its certificate to a certificate revocation list (CRL) which is sent to telecommunication services provider, 203, through the regular secure payment gateway, 206, so that the telecommunication services provider knows to deny attempts to use the wireless telecommunications device.

U.S. Pat. No. 5,289,526 discloses a method and apparatus for monitoring and reporting information relating to the operation of cellular telephone systems. The patent discloses that the method and apparatus may be employed to analyze the performance of a cellular system as it is acting in the field.

U.S. Pat. No. 5,471,526 discloses a method and apparatus for detecting events occurring in a telecommunications network. The method and apparatus include stored program control exchanges that execute software programs having controlled sequences that are responsive to certain events.

U.S. Pat. Nos. 5,572,571; 5,828,956; and 6,018,656 disclose a method and apparatus that permit a buyer to program the necessary information to incorporate a cellular telephone into a network without assistance from a dealer.

U.S. Pat. No. 6,223,290B1 discloses a method and apparatus for controlling use of an electronic system, including a cellular telephone. The patent discloses that the method and apparatus may be employed to identify and prevent fraudulent use of the cellular telephone.

U.S. Application No. 2002/0186845A1 discloses a method and apparatus for remotely disabling and enabling access to secure transaction functions of a mobile phone. The method and apparatus, which enable a buyer to immediately block access to the payment and buyer authentication functions in a security element of the phone, include a step or means for verifying the authenticity of the buyer.

WO 02/01891 discloses a system for storing information while using a mobile communication device such as a mobile phone. The system, which stores data from a mobile communications device over a mobile communications network to a remote storage device, permits a buyer to have access to increased capacity.

None of the references discloses or suggests a system or method that enables a buyer to certify and activate a used wireless telecommunications device. There is thus a need for a system and method that enables a buyer to certify and activate a used wireless telecommunications device.

SUMMARY OF THE INVENTION

All patents and patent publications cited herein are hereby incorporated herein by reference.

An object of the present invention is to provide a system and method that enable a buyer to certify and activate a used wireless telecommunications device.

According to an object of the invention, the system comprises a web server and the method comprises the use of the web server. The system and method involve the buyer using the web server to certify and activate a used wireless telecommunications device. The buyer may also use the web server to access additional information related to telecommunication services available to the buyer. In accordance with this object, a system and method for accessing information and for establishing a telecommunication services account are provided. The system and method comprise providing access to information regarding telecommunication services and optionally establishing an account for the telecommunication services.

According to another object of the invention, the system comprises a live operator and the method comprises the use of the live operator. The system and method involve the buyer contacting the live operator via, e.g., the use of an "800" number and communicating with the live operator to certify and activate a used wireless telecommunications device. The buyer may also use the live operator to access additional information related to telecommunication services available to the buyer. In accordance with this object, a system and method for accessing information and for establishing a telecommunication services account are provided. The system and method comprise providing access to information regarding telecommunication services and optionally establishing an account for the telecommunication services.

According to yet another object of the invention, the system comprises an e-mail system and the method comprises the use of the e-mail system. The system and method involve the buyer using the e-mail system to certify and activate a used wireless telecommunications device. The buyer may also use the e-mail system to access additional information related to telecommunication services available to the buyer. In accordance with this object, a system and method for accessing information and for establishing a telecommunication service are provided. The system and method comprise providing access to information regarding telecommunication services and optionally establishing an account for the telecommunication services.

According to yet a further object of the invention, the system comprises an interactive voice system ("IVS") and/or an interactive data system ("IDS"). Once the buyer is identified, the buyer may obtain information regarding its used telecommunication device and/or available telecommunication services. The system and method involve the buyer using the IVS and/or the IDS to certify and activate a used wireless telecommunication device. The buyer may also use the IVS and/or IDS to access additional information related to telecommunication services available to the buyer. In accordance with this object, a system and method for accessing information and for establishing a telecommunication service are provided. The system and method comprise providing access to information regarding telecommunication services and optionally establishing an account for the telecommunication services.

These and other objects of the invention will be apparent to those of ordinary skill in the art from the following Detailed Description and the drawings.

DETAILED DESCRIPTION OF THE PREFERRED EMBODIMENTS

Figure 1:
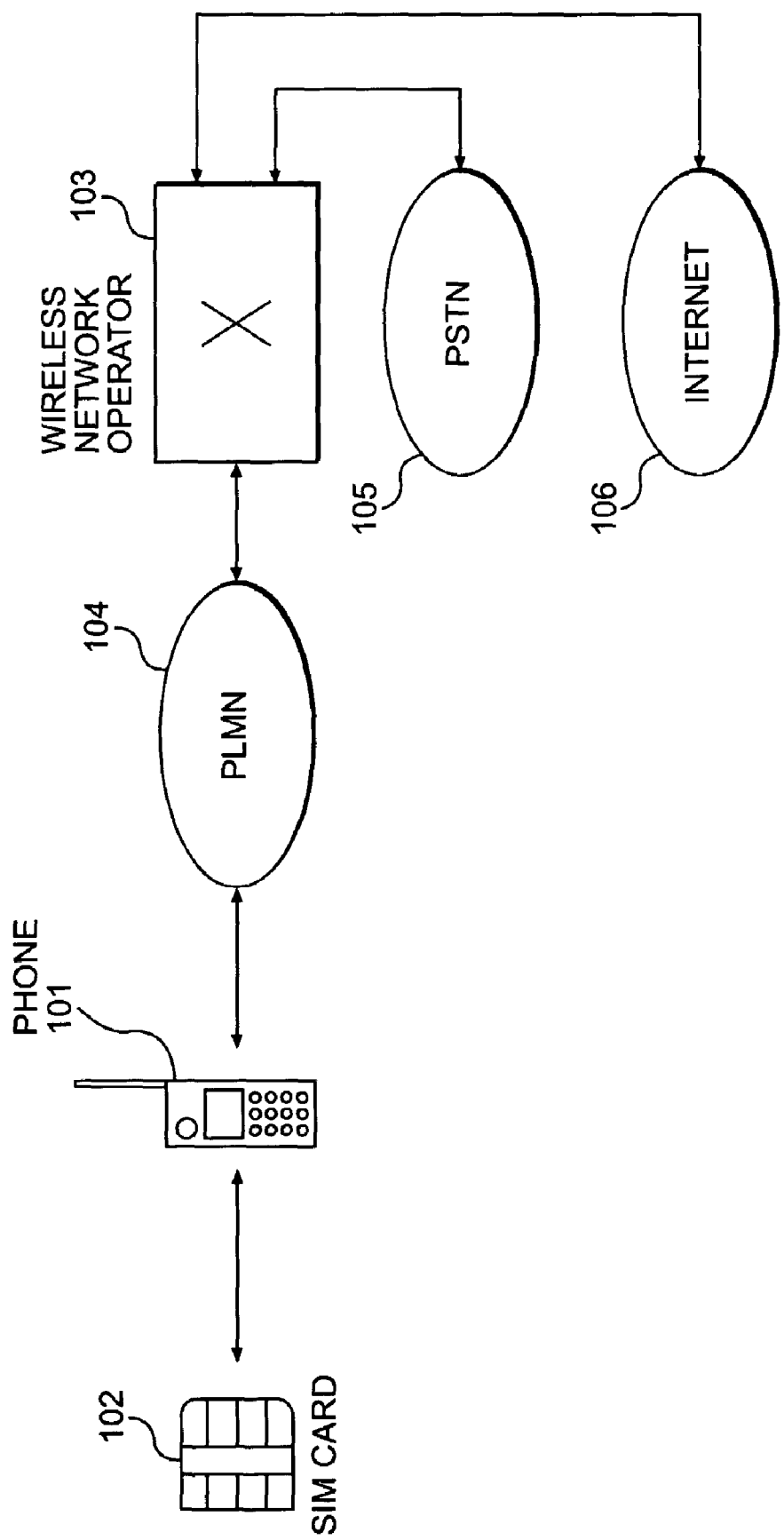
FIG. 1 illustrates one way a lost or stolen telecommunications device is disabled in the prior art.
Figure 2A:
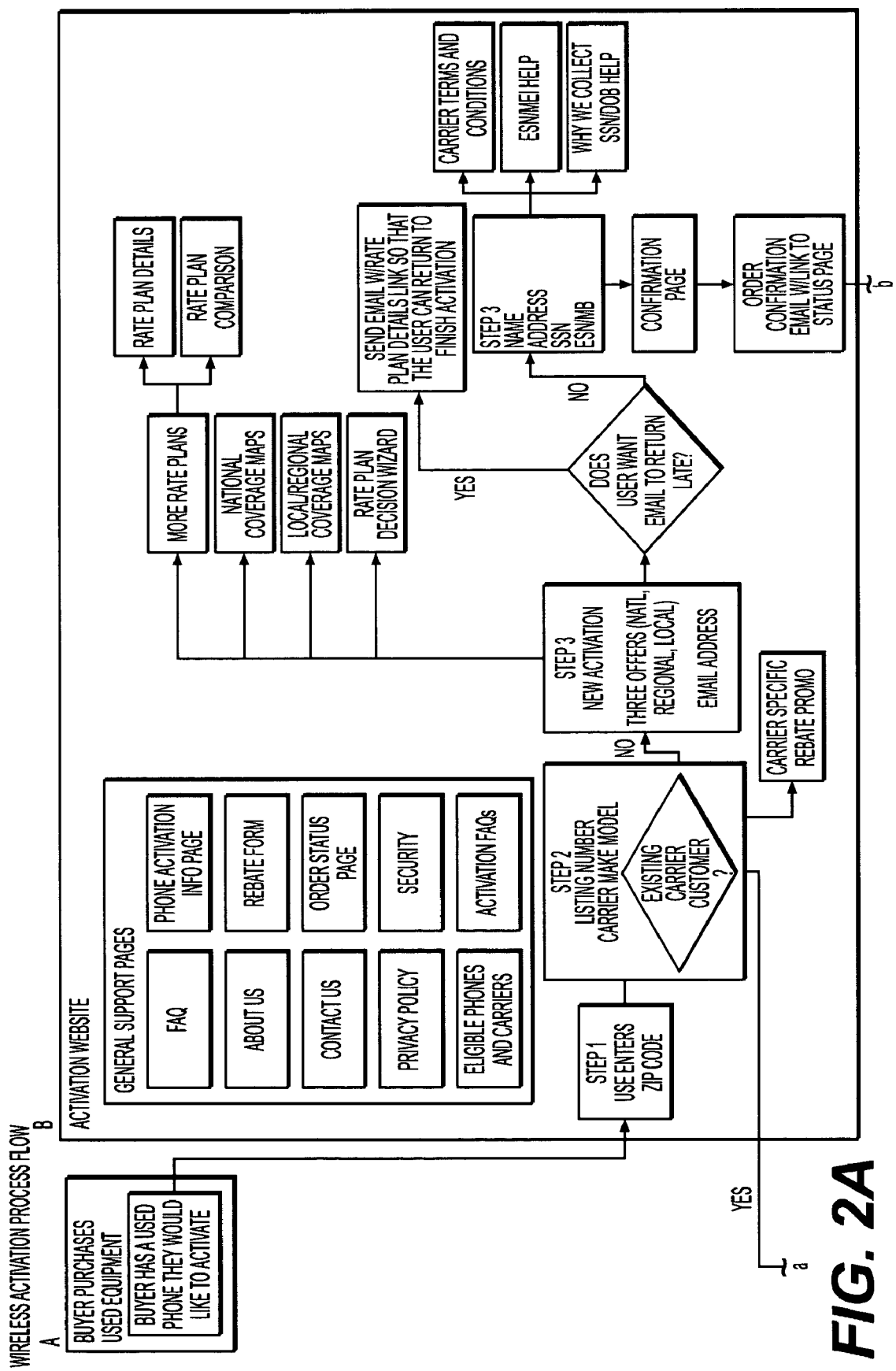
FIG. 2 is a flow chart showing an example of a system and method that enable a buyer to certify and activate a used wireless telecommunications device in accordance with the invention.
Figure 2B:
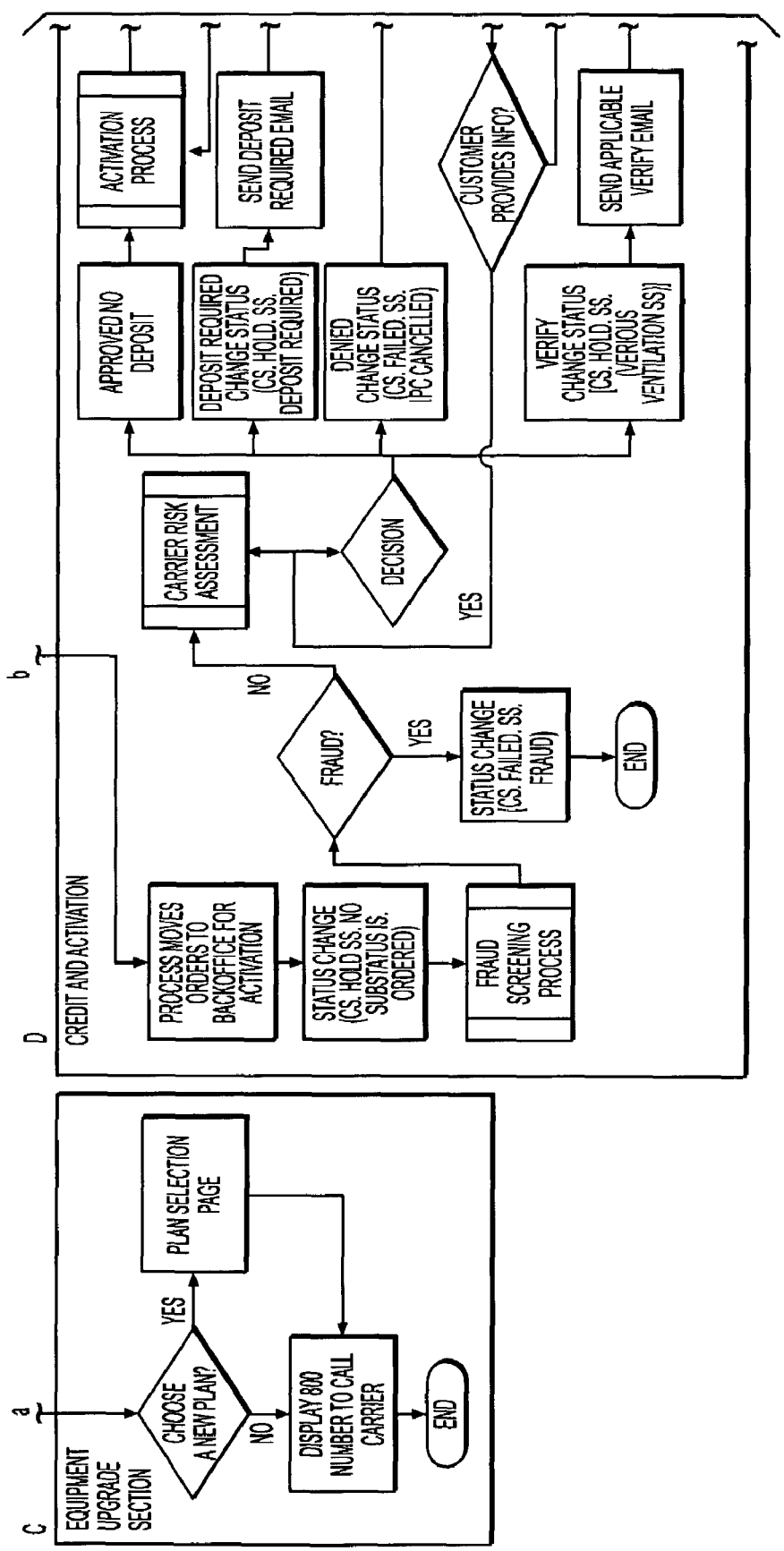
Figure 2C:
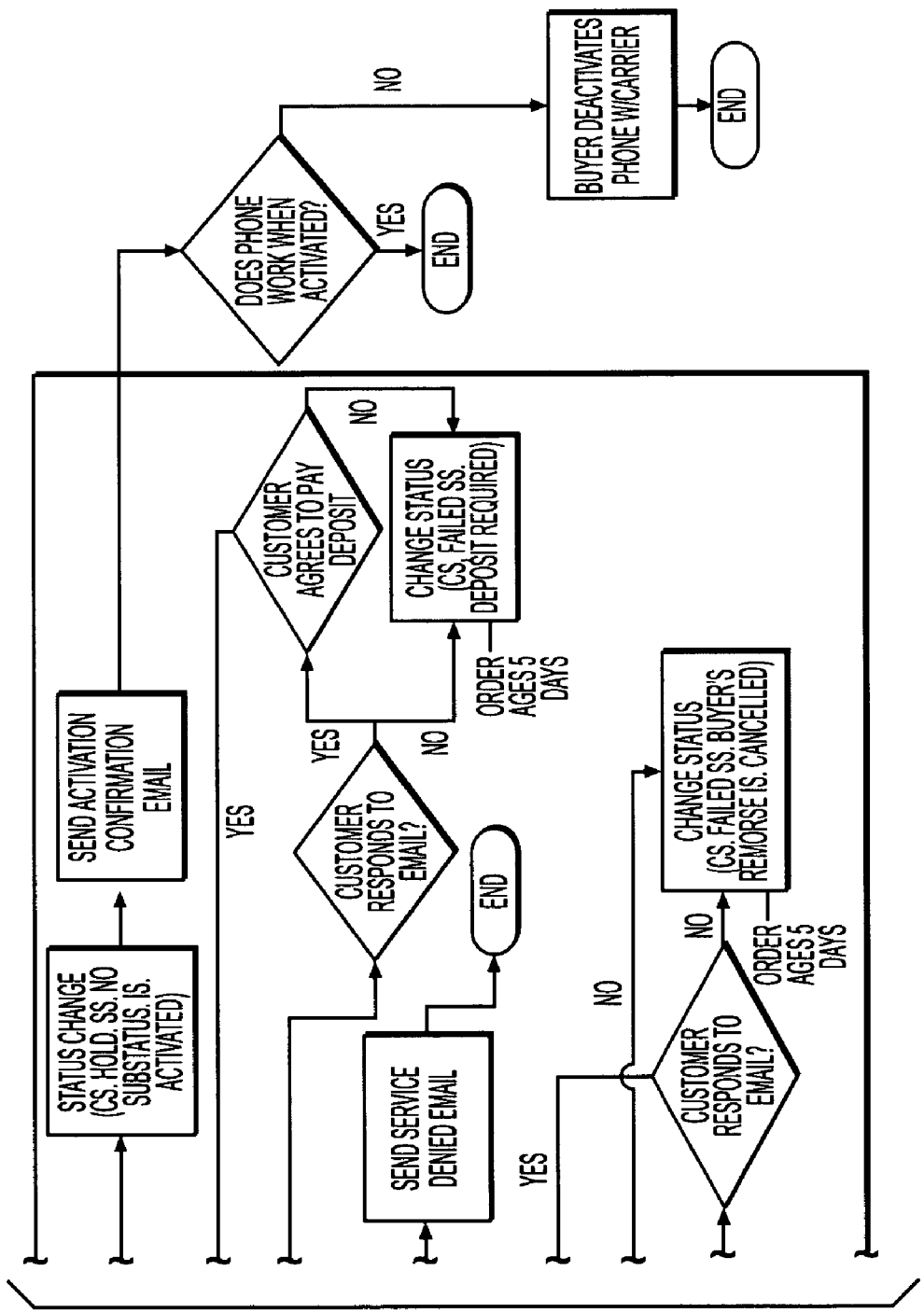

The invention will now be described by reference to FIG. 2. FIG. 2 is a flow chart showing an example of a system and method that enable a buyer to certify and activate a used wireless telecommunications device in accordance with the invention. Although FIG. 2 regards the use of a website for certification and activation, as discussed herein, certification and/or activation may also be accomplished by other means, including via e-mail communication, via an IVS and/or an IDS, and/or via interaction with a live operator.

An exemplary embodiment of the present invention is a method for enabling access to a used telecommunications device comprising receiving a request from a buyer; identifying one or more telecommunication services providers available to the buyer; allowing the buyer to select a telecommunication services provider; and communicating the buyer's selection to the telecommunication services provider, wherein said telecommunication services provider enables access to said used telecommunications device.

Referring to FIG. 2, a buyer purchases a used wireless telecommunications device by use of, for example, an on-line purchasing service. The buyer then accesses a "certification and activation" website through which the buyer may submit a request for telecommunication services. Although the term "certification and activation" website is employed herein, it is to be understood that it is contemplated that certification and activation are independent steps in the system and method of the invention and that each can be carried out independently via each of the means described herein.

The certification and activation website first queries the buyer to determine whether the used telecommunication device is approved for the network and that it is not listed on the "do not activate" list as lost, missing, stolen, etc. The certification is accomplished by the buyer identifying the used telecommunication device via, e.g., the used telecommunication device's identification number, and the certification and activation website processing this information to determine whether the used telecommunication device is certifiable. Once the buyer's use of the used telecommunication device is certified, the web site then provides information regarding telecommunication services that are available to the buyer. The buyer may access this information by entering information regarding the buyer's anticipated usage area, e.g., a zip code. As demonstrated in more detail in the example below, the buyer is then provided with the option of activating its telecommunications device. At this time, the buyer is also provided with various options with regard to its telecommunications services.

After the buyer selects a telecommunication service provider, that selection is communicated to the services provider and the services provider enables access to the used telecommunications device. The website, IVS, IDS and/or live operator may then confirm that the telecommunications device is enabled.

According to another exemplary embodiment of the invention, an apparatus is provided for remotely enabling access to a used telecommunications device comprising means for receiving a request from a buyer; means for identifying one or more telecommunication services carriers available to the buyer; means for allowing the buyer to select a telecommunication services provider; means for communication the buyer's selection to the telecommunication services provider; and means for said telecommunication services provider to enable access to said used telecommunications device.

According to another exemplary embodiment a computer program is provided for enabling access to a used telecommunications device comprising means for receiving a request from a buyer; means for identifying one or more telecommunication services providers available to the buyer; means for allowing the buyer to select a telecommunication services provider; and means for communicating the buyer's selection to the telecommunication services provider, wherein said telecommunication services provider enables access to said used telecommunications device.

According to another exemplary embodiment a programmed computer system is provided for enabling access to a used telecommunications device comprising means for receiving a request from a buyer; means for identifying one or more telecommunication services providers available to the buyer; means for allowing the buyer to select a telecommunication services provider; and means for communicating the buyer's selection to the telecommunication services provider, wherein said telecommunication services provider enables access to said used telecommunications device.

EXAMPLE

The system and method of the invention may be employed in combination with on-line purchasing services. By way of example, the invention provides a method for the on-line purchasing service auction winners to enter information about their used telecommunications device and certify and activate the used telecommunications device.

The first step in the process is for an on-line seller to add HTML to their auction listing encourage buyers to certify and activate their used telecommunications device after purchase. A buyer who has won a telecommunications device can then access a site explaining available telecommunication services by clicking on a link from the auction or the end-of-auction e-mail sent by the on-line purchasing service. If the buyer chooses to continue, it can enter information that is used by the telecommunication services provider to identify which carriers have service in the buyer's anticipated usage area. Such information may include, but is not limited to, the buyer's area code, the buyer's zip code, etc. The buyer can also access a telecommunications device selection page where it may identify its telecommunications device by, e.g., manufacturer, model number, and carrier. Next, the buyer is presented with the option to choose a telecommunication services plan. Once a buyer has selected a telecommunication services plan, it is presented with a screen asking it to enter activation information (e.g., name, address, and information used by the carriers to do a credit assessment on the buyer).

Once the order has entered the telecommunication service providers' database, the order is communicated to the telecommunication service provider's certification and activation system and is treated as a special type of activation. E-mail, IVS and/or IDS statuses are sent to the buyer throughout the activation process to let the buyer know the status of the order. The buyer may also access status information via the internet. Once activation is successful, a welcome kit is shipped to the buyer along with an e-mail, an IVS and/or an IDS announcement announcing the successful activation as well as instructions (when necessary).

While, in the foregoing, the present invention has been described in accordance with specific embodiments, those skilled in the art would appreciate that variations of these embodiments fall within the scope of the invention. As a result, the invention is not limited to the specific examples and illustrations discussed above.

What is claimed is:

1. A method of certifying a telecommunications device for activation by a buyer, wherein the telecommunications device was previously used to access telecommunications services, the method comprising:
   receiving an identifier associated with the telecommunications device, wherein the telecommunications device is not activated;
   comparing the identifier to one or more identifiers associated with telecommunications devices that are indicated as not certifiable; and
   certifying the telecommunications device in response to the comparison prior to providing the buyer an option to activate the telecommunications device.

2. The method of claim 1, wherein activating the telecommunications device further comprises the steps of:
   identifying one or more telecommunications service providers available to the buyer;
   receiving a selection associated with one of the one or more telecommunications service providers; and
   enabling access by the telecommunications device to telecommunications services provided by the selected one of the one or more telecommunications service providers.

3. The method of claim 1, wherein the telecommunications device was previously used to access telecommunications services by a user other than the buyer.

4. The method of claim 2, wherein identifying one or more telecommunications service providers further comprises identifying one or more telecommunications service providers in response to a zip code of the buyer.

5. The method of claim 2, wherein identifying one or more telecommunications service providers further comprises identifying one or more telecommunications service providers in response to an area code of the buyer.

6. The method of claim 1, wherein comparing the identifier to one or more identifiers associated with telecommunications devices that are indicated as not certifiable further comprises comparing the identifier to one or more identifiers associated with telecommunications devices that are indicated as being stolen.

7. The method of claim 1, wherein comparing the identifier to one or more identifiers associated with telecommunications devices that are indicated as not certifiable further comprises comparing the identifier to one or more identifiers associated with telecommunications devices that are indicated as being lost.

8. The method of claim 1, wherein receiving an identifier associated with the telecommunications device further comprises receiving the identifier through an Internet website.

9. The method of claim 1, wherein receiving an identifier associated with the telecommunications device further comprises receiving the identifier through an interactive voice system.

10. The method of claim 1, wherein receiving an identifier associated with the telecommunications device further comprises receiving the identifier through an interactive data system.

11. The method of claim 1, and further comprising providing a uniform resource locator, the uniform resource locator being used by a seller of the telecommunications device to allow the buyer to access a website for the purpose of certifying the telecommunications device, and wherein receiving an identifier further comprises receiving the identifier using the website.

12. The method of claim 11, wherein the uniform resource locator is displayed on a listing of an auction to purchase the telecommunications device.

13. A system for certifying a telecommunications device for activation by a buyer, wherein the telecommunications device was previously used to access telecommunications services, the system comprising:
   means for receiving an identifier associated with the telecommunications device wherein the telecommunications device is not activated;
   means for comparing the identifier to one or more identifiers associated with telecommunications devices that are indicated as not certifiable; and
   means for certifying the telecommunications device in response to the comparison prior to providing the buyer an option to activate the telecommunications device.

14. The system of claim 13, the system further comprising:
   means for identifying one or more telecommunications service providers available to the buyer;
   means for receiving a selection associated with one of the one or more telecommunications service providers; and
   means for enabling access by the telecommunications device to telecommunications services provided by the selected one of the one or more telecommunications service providers.

15. The system of claim 14, wherein the means for identifying one or more telecommunications service providers further comprises means for identifying one or more telecommunications service providers in response to a zip code of the buyer.

16. The system of claim 14, wherein the means for identifying one or more telecommunications service providers further comprises means for identifying one or more telecommunications service providers in response to an area code of the buyer.

17. The system of claim 13, wherein the means for comparing the identifier to one or more identifiers associated with telecommunications devices that are indicated as not certifiable further comprises means for comparing the identifier to one or more identifiers associated with telecommunications devices that are indicated as being stolen.

18. The system of claim 13, wherein the means for comparing the identifier to one or more identifiers associated with telecommunications devices that are indicated as not certifiable further comprises means for comparing the identifier to one or more identifiers associated with telecommunications devices that are indicated as being lost.

19. A computer program for certifying a telecommunications device for activation by a buyer, wherein the telecommunications device was previously used to access telecommunications services, the computer program being executable by a processor, the computer program being operable when executed by the processor to:
   receive an identifier associated with the telecommunications device, wherein the telecommunications device is not activated;
   compare the identifier to one or more identifiers associated with telecommunications devices that are indicated as not certifiable; and
   certify the telecommunications device in response to the comparison prior to providing the buyer an option to activate the telecommunications device.

20. The computer program of claim 19, wherein the computer program is further operable when executed by the processor to:
   identify one or more telecommunications service providers available to the buyer,
   receive a selection associated with one of the one or more telecommunications service providers; and
   enable access by the telecommunications device to telecommunications services provided by the selected one of the one or more telecommunications service providers.

21. The computer program of claim 20, wherein the computer program is further operable to identify one or more telecommunications service providers in response to a zip code of the buyer.

22. The computer program of claim 20, wherein the computer program is further operable to identify one or more telecommunications service providers in response to an area code of the buyer.

23. The computer program of claim 19, wherein the computer program is further operable to compare the identifier to one or more identifiers associated with telecommunications devices that are indicated as being stolen.

24. The computer program of claim 19, wherein the computer program is further operable to compare the identifier to one or more identifiers associated with telecommunications device that are indicated as being lost.

* * * * *